United States Patent
Bou-Diab et al.

(10) Patent No.: US 7,535,845 B2
(45) Date of Patent: May 19, 2009

(54) INTELLIGENT SELECTIVE FLOW-BASED DATAPATH ARCHITECTURE

(75) Inventors: Bashar Said Bou-Diab, Ottawa (CA); Lyle Strub, Ottawa (CA); Milan Zoranovic, Kanata (CA); Gerard Damm, Plano, TX (US); Jerome Cornet, Ottawa (CA)

(73) Assignee: Alcatel Lucent, Paris (FR)

( * ) Notice: Subject to any disclaimer, the term of this patent is extended or adjusted under 35 U.S.C. 154(b) by 728 days.

(21) Appl. No.: 10/974,844

(22) Filed: Oct. 28, 2004

(65) Prior Publication Data

US 2006/0165049 A1     Jul. 27, 2006

(51) Int. Cl.
*H04L 12/56* (2006.01)
*H04J 1/16* (2006.01)

(52) U.S. Cl. .................................. 370/238; 370/252

(58) Field of Classification Search .............. 370/218, 370/230.1, 230–235, 389, 395.32, 392, 412, 370/422, 401, 238, 237, 252; 709/223, 238–242
See application file for complete search history.

(56) References Cited

U.S. PATENT DOCUMENTS

| | | | |
|---|---|---|---|
| 5,949,786 A * | 9/1999 | Bellenger | 370/401 |
| 6,643,260 B1 * | 11/2003 | Kloth et al. | 370/235 |
| 6,798,746 B1 * | 9/2004 | Kloth et al. | 370/235 |
| 6,798,777 B1 * | 9/2004 | Ferguson et al. | 370/392 |
| 6,980,552 B1 * | 12/2005 | Belz et al. | 370/392 |
| 7,215,637 B1 * | 5/2007 | Ferguson et al. | 370/230.1 |
| 7,433,365 B1 * | 10/2008 | Burch et al. | 370/437 |
| 2005/0078601 A1 * | 4/2005 | Moll et al. | 370/218 |
| 2005/0238011 A1 * | 10/2005 | Panigrahy | 370/389 |
| 2006/0159019 A1 * | 7/2006 | Buskirk et al. | 370/235 |

* cited by examiner

*Primary Examiner*—John Pezzlo

(57) ABSTRACT

A selective, flow-based datapath architecture is described. A Flow Control Block Manager (FCBM) is located in a flow-based datapath for selectively and intelligently processing packets in the Flow Path. If, according to the FCBM, efficiency gains can be achieved by creating a flow control block and employing flow-based processing on a packet stream, the packets are processed accordingly. If, however, insufficient gains are anticipated the packets are processed in a flow-unaware manner. The FCBM determines the manner in which to process packets based on a set of criteria.

15 Claims, 4 Drawing Sheets

Selective Flow-Based Datapath Model

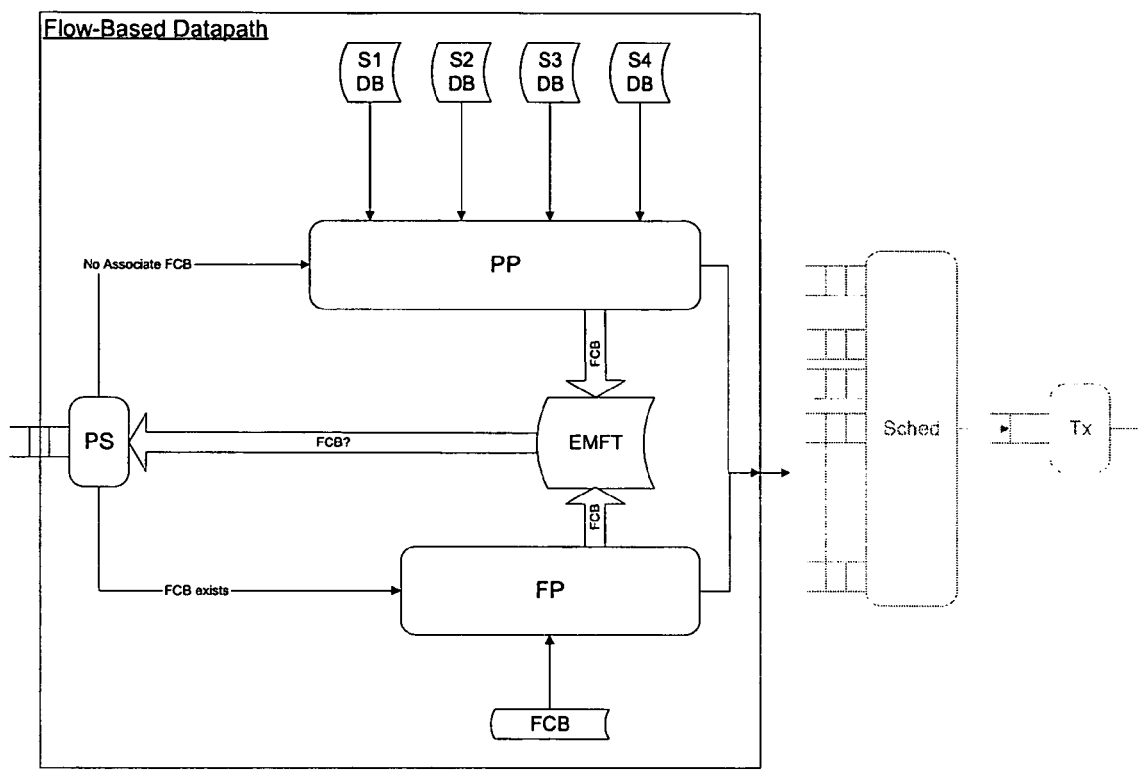
Figure 1: Flow-Based Datapath Model

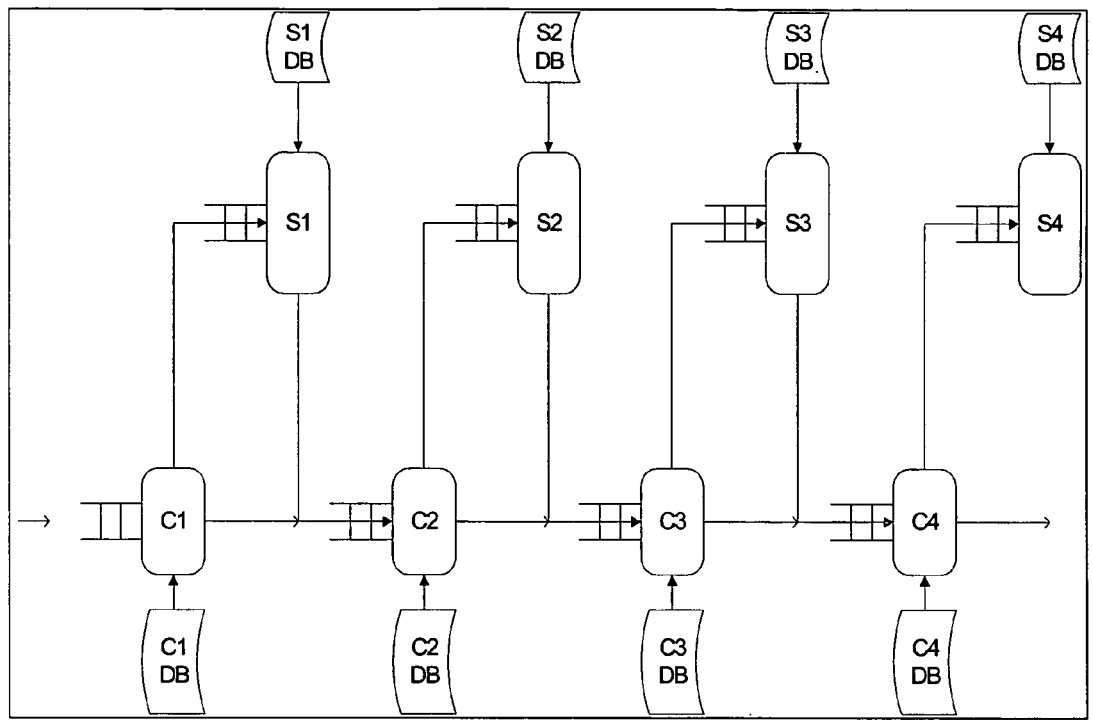
Figure 2: Packet Path Example

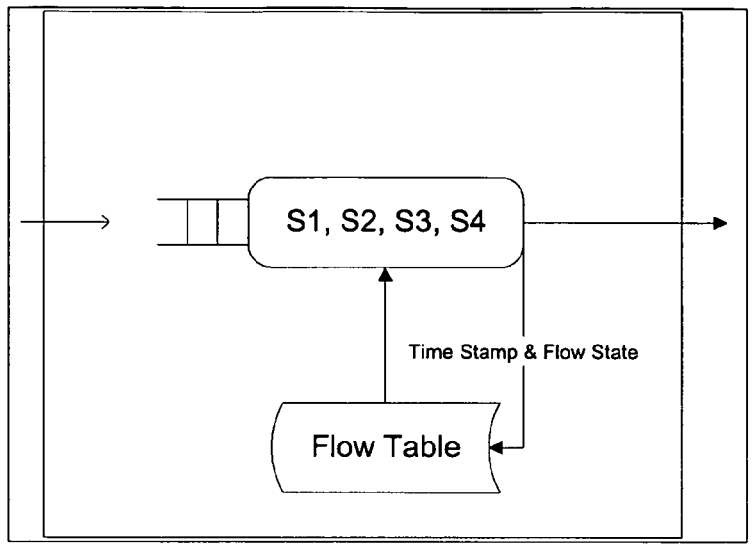
Figure 3: Flow Path Example
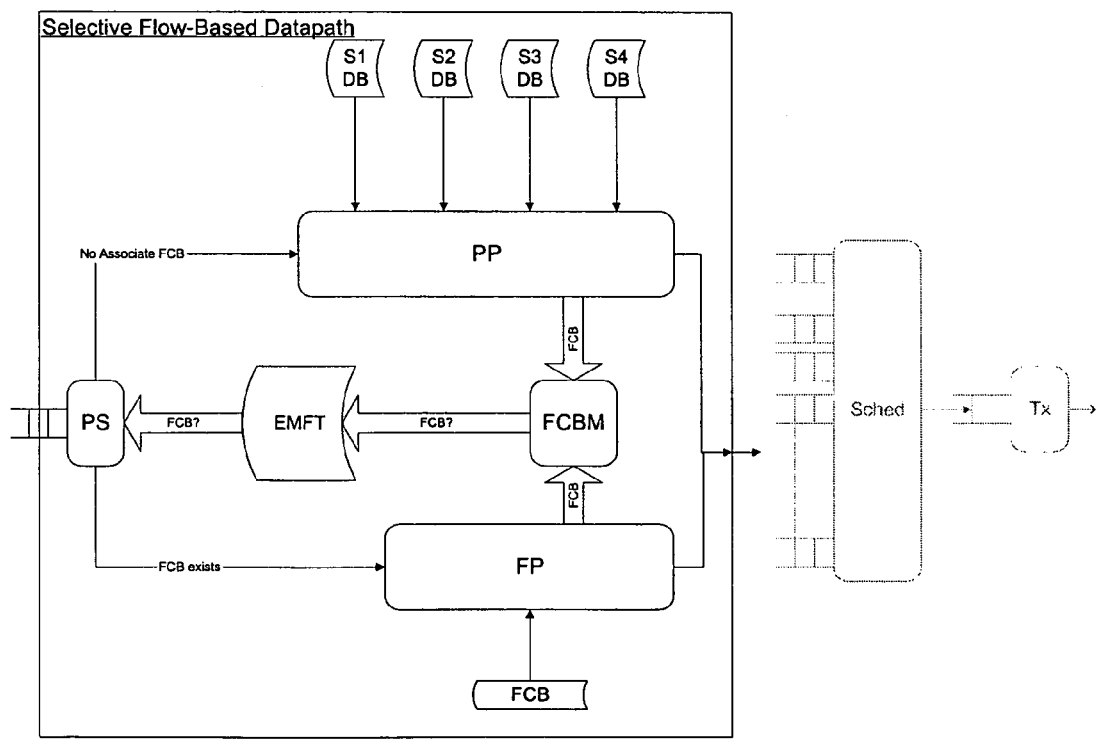
Figure 4: Selective Flow-Based Datapath Model

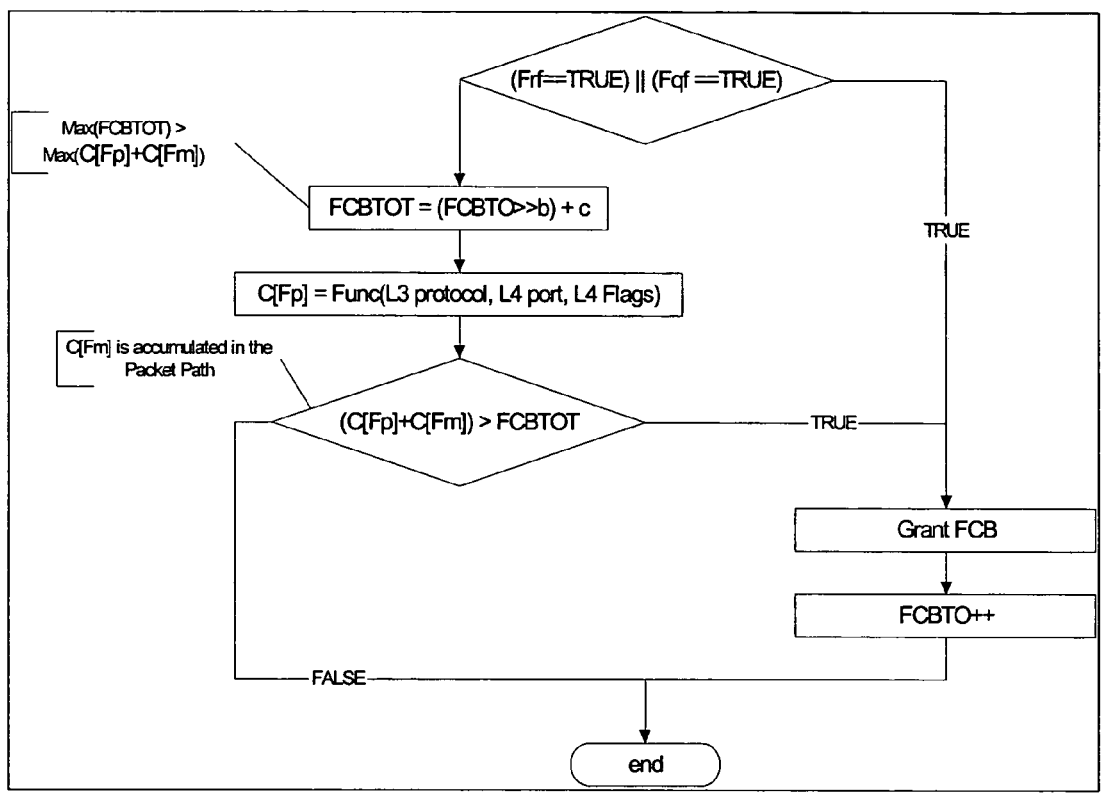
Figure 5: FCBM Algorithm Example

INTELLIGENT SELECTIVE FLOW-BASED DATAPATH ARCHITECTURE

FIELD OF THE INVENTION

This invention relates to packet processing at network nodes and more particularly to systems and methods of improving datapath processing utilizing a selective, flow-based datapath architecture.

BACKGROUND

The ever expanding use of the public Internet and private Intranet has meant a greater emphasis on improving functionality, performance, and quality of service in packet processing and in particular IP packet processing for digital communications. One critical aspect involved in achieving improved performance relates to datapath processing at each network node through which the path extends. This processing, as will be known to one skilled in the art, relates to multiple operations performed on the packets traversing each network node. These operations comprise the physical implementation of many services including, but not limited to, packet header verification according to protocol specification, packet classification according to service policies, packet modification according to selected services, packet queuing according to quality of service (QOS) policy, etc.

Traditionally, IP packet processing has been implemented utilizing one of two datapath architectures. These two architectures are packet-based datapath and flow-based datapath. In a flow-based datapath architecture, information which is searched, retrieved or calculated during the processing of the initial packet of a flow is cached for reuse during processing of subsequent packets of the same flow. Packet-based datapath architectures, on the other hand, treat each packet independently.

Flow-based datapath architectures are known in such implementations as NetFlow service acceleration used by Cisco systems and by Caspian Network's flow-based routing schemes.

Typically, a flow-based datapath builds a flow table, an entry in the flow table being a flow control block (FCB), for capturing essential elements of a flow. This happens either during the processing of the first packet of a flow appearing at the flow-based datapath or as a result of a control plane command issued before the first flow packet is encountered. When a packet is received at the node, the packet is associated with a FCB, and the FCB is retrieved from memory and used to grant the packet all required services with minimal additional accesses to memory. As will be apparent, this minimizes processor stalls by reducing memory accesses, accelerates packet processing, improves router/switch throughput and reduces cross-network delay.

A flow-based datapath model, as shown in FIG. 1, includes a Path Selector (PS), a Packet Path (PP) for the processing of the first packet of a flow in a manner almost identical to a packet-based datapath and a Flow Path (FP) for processing of subsequent packets of a flow.

The Path Selector is the first processing stage in a flow-based datapath. The Path Selector attempts to associate an ingress packet with an existing Flow Control Block. If an associated FCB exists in the Exact Match Flow Table (EMFT) the Path Selector relays the packet and the FCB ID to the Flow Path. Otherwise, the Path Selector relays the packet to the Packet Path. Associating a packet with a FCB entry could be achieved by performing an exact match lookup, such as a hash lookup, in the EMFT.

The Packet Path (PP) processes all packets independently. The example Packet Path shown in FIG. 2 implements four services. Each of the services is implemented in two stages: a classification stage "Cx" and a service stage "Sx". The classification stage determines if a packet should be afforded the corresponding service by using a classification rule database, "Cx DB". The service stage renders the service on the deserving packets using a service parameter database, "Sx DB". The example shows an extreme case where all the classification and the service parameter databases are separate. In practice, these databases are combined as much as possible to reduce memory bandwidth overhead and packet latency. However, in most instances the individual SxDBs are kept separate because there is unlikely to be a one-to-one service policy correspondence. One such example is a module that includes an IPv4 forwarding service and a symmetric NAT (Network Address Translation) service. Each of these services maintains a separate SxDB. The IPv4 FIB (Forwarding Information Base) uses a longest matching prefix search algorithm and the symmetric NAT database use an exact match table, such as a hash table. During packet processing, the PP creates a flow profile. The flow profile describes all the services that were afforded to the packet and includes all the parameters needed for these services.

The Flow Path (FP) receives an ingress packet and an FCB identifier from the Path Selector. The FP uses the FCB associated with a packet to process the packet. In an ideal case, the FCB is the only entity retrieved by the FP from memory to process the packet. The FCB contains all required service parameters for packet processing, such as next-hop information, packet modification information, flow packet counters, flow state, etc. The flow state would be used to afford services that require stateful inspection, such as NAT. The Flow Path updates the timestamp that indicates when the last packet was received and the new dynamic flow state in the FCB. This timestamp is used for aging the FCB entry if the flow is inactive for a configurable period of time that is referred to as the flow timeout value. FIG. 3 shows an example abstraction of a FP.

The Flow-Based Datapath model has several limitations. One major limitation is that every traffic flow requires a FCB regardless of how many memory accesses are needed to process the packets in the packet path and regardless of the expected number of packets in the flow. This limitation imposes hard memory requirements on high-throughput Flow-Based Datapaths without efficiently trading the increased memory requirements for processing gains. For example, Internet traffic measurements under steady state traffic conditions show that on a 10 Gbps line, one would normally observe more than 2 million active flows using a flow timeout value of 15 seconds. DOS (Denial of Service) attacks utilizing the entire 10 Gbps with 24 million packets per second could raise the number of flows to a theoretical maximum of 360 million. For an FCB table of 4 million entries and assuming that each FCB on a service-rich datapath requires 128 bytes of storage, then a whopping 512 Mbytes of memory is needed for the FCB table alone. For this reason, as the number of active flows expected in a datapath increases, the storage requirements of the Flow Table data structure becomes extremely large which makes the pure Flow-Based Datapath architecture virtually unworkable.

Another limitation of the pure Flow-Based Datapath is the FCB creation overhead that is incurred on every flow regardless of the flow nature. This overhead may outweigh the advantages of flow-based processing for flows with a small number of packets.

SUMMARY OF THE INVENTION

Traditional flow-based datapath processing of IP packets requires a Flow Control Block (FCB) for each flow and this results in large FCB storage requirement when there are many flows (e.g. 4 million active flows on one 10 Gbps line requires 512 Mbytes). Furthermore, using Packet Path processing instead of flow-based processing can be more efficient on smaller flows. Accordingly, there is a need for an architecture that effectively and selectively combines the two processing schemes.

The present invention achieves the desired effect by introducing a FCB Manager (FCBM) in the traditional flow-based datapath architecture to add selectivity to the processing approach. The FCBM applies criteria on the first packet of a flow to determine whether to create a FCB for a flow and perform flow-based processing for subsequent packets of the same flow, or to omit FCB creation and perform Packet Path processing for the rest of the flow packets. This decision making ability results in more efficient processing, which enables flow-based datapath processing to be used in cases where it was previously not feasible (e.g. on high capacity nodes with large numbers of active flows).

Therefore in accordance with a first aspect of the present invention there is provided a packet processor for datapath processing of IP packets, the packet processor having a Path Selector, a Packet Path, a Flow Path and an Exact Match Flow Table, with the improvement over traditional datapaths being the addition of a Flow Control Block Manager for the selective creation of a Flow Control Blocks based on the selective assignment of flows to the Packet Path or the Flow Path.

In accordance with a second aspect of the present invention there is provided a method of implementing flow-based datapath processing of IP packets comprising: determining whether to create a Flow Control Block for a flow based on predetermined criteria, and responsive to the determination being in the affirmative, creating a Flow Control Block for the flow and performing flow-based datapath processing on subsequent IP packets of the flow.

In accordance with a further aspect of the present invention there is provided a Flow Control Block Manager for use in selectively creating a Flow Control Block for a data flow during datapath processing of IP packets.

BRIEF DESCRIPTION OF THE DRAWINGS

The invention will now be described in greater detail with reference to the attached drawings wherein:

FIG. 1 illustrates a flow-based datapath model according to the prior art;

FIG. 2 illustrates an example of a packet path;

FIG. 3 illustrates a flow path example;

FIG. 4 illustrates components of the selective flow-based datapath model according to the present invention; and FIG. 5 illustrates the algorithm implemented by the flow control block manager.

DETAILED DESCRIPTION OF THE INVENTION

As indicated previously, FIG. 1 shows a typical flow-based datapath model. The Path Selector (PS) on receipt of a packet determines whether there exists a Flow Control Block with cached information. If a corresponding FCB does not exist the packet is forwarded through the Packet Path and the relevant information is cached in a new FCB. In the process of determining whether a FCB exists the Exact Match Flow Table is searched and if a match is indicated the packet is directed through the Flow Path.

According to the present invention a Flow Control Block Manager (FCBM) is introduced. The FCBM is an intelligent mechanism that fits into a flow-based datapath for selectively processing packets in the Flow Path resulting in what is known herein as a selective flow-based datapath. A selective flow-based datapath treats the limitations of a flow-based datapath by intelligently selecting which flows are afforded Flow Control Blocks by the FCBM and which flows are processed in the Packet Path in a flow-unaware manner. FIG. 4 is a block diagram of a selective flow-based datapath and shows how the FCBM fits into the datapath.

The Flow Control Block Manager determines whether to create a FCB entry in the EMFT for the flow using on a set of criteria. The FCBM does not simply grant an FCB entry to every flow because the size of the FCB table may be significantly less than the number of active flows. Consequently, the FCBM uses predefined rules and embedded intelligence to determine whether an FCB is granted to a flow. The criteria for affording a FCB entry to the flow takes into account the following parameters:

L4 (Layer 4) flow-based service requirement flag (Frf): Some flows require a flow-based service such as NAT, Flow Intercept, and Flow Redirect. These flows are always afforded FCBs. This flag is determined in the Packet Path processing of the first flow packet. FCBs may be created as a result of a management request to monitor, intercept, or redirect a specific flow.

Flow QoS requirement flag (Fqf): Some dynamic flows require per flow QoS treatment such as RTP (Real Time Protocol) streams that need particular DiffServ marking. These flows are always allocated FCBs. This flag is determined in the Packet Path processing of either the first flow packet, or the analysis of the signaling messages that initiated the dynamic flow. In both cases, the processing takes into account an operator-provisioned flexible QoS policy.

Number of memory accesses in packet path: The higher the number of memory accesses afforded to a packet in a flow, the better the gain that could be expected of flow-based processing. Consequently, FCB eligibility for a given flow increases directly with increasing service participation and number of memory accesses required as is observed in the Packet Path processing of the first flow packet. The credits for number of memory accesses, C[Fm], is directly proportional to the number of memory accesses performed during processing in the Packet Path. C[Fm] is the credit for the number of memory accesses, which is determined in the processing of the first flow packet in the Packet Path.

Estimated number of packets in the flow: Flows that are expected to have a large number of packets benefit significantly from flow-based processing. This number could be inferred in most cases from the L3 (Layer 3) protocol type or L4 port number. For example, one may expect ICMP, OSPF, and SIP flows to be short flows; and expect Telnet, FTP (File Transfer Protocol), RTP and RTDP (Real Time Description Protocol) to be long flows. The credits for expected number of flow packets, C[Fp], is a function of the protocol type and port numbers. C[Fp] is directly proportional to the expected number of packets in a flow.

Flow Control Block Table Occupancy Threshold (FCB-TOT): This threshold controls FCB eligibility based on the FCB table occupancy. As EMFT occupancy rises, the probability of affording new FCBs decreases. A congestion algorithm monitors the Exact Match Flow Table and controls FCB eligibility criteria. The FCBTOT is a function of the FCBT occupancy (FCBTO).

The FCBM employs a number of thresholds on the EMFT. As the EMFT occupancy level passes specified thresholds, the criteria for adding new FCBs to the EMFT change adaptively. The FCBM executes a fast algorithm that uses weighted credits and flags to determine FCB eligibility for a specific flow. FIG. 5 shows an example of a FCBM algorithm.

Moreover, the FCBM processes control plane commands for flow management functions such as flow interception, flow redirection, flow filtering, etc.

Each FCB also has a life span that is related to the life of the flow, as perceived by the FCBM. The FCBM deletes FCB entries either when the session is terminated (TCP FIN or TCP RESET), or when the flow has been inactive for a certain length of time (timeout value).

In the case of high EMFT occupancy, the FCBM may also re-evaluate the criteria of existing flow entries and remove low credit FCBs from the EMFT to make room for new high credit flows. For example, low rate TCP flows may be removed in order to add NAT flows.

There are several advantages for a Selective Flow-Based Datapath architecture over a pure Flow-Based Datapath architecture. Some of these advantages are set out below.

A Selective Flow-Based Datapath requires less memory storage space than a pure Flow-Based Datapath because a FCB entry is stored only for flows where the processing gains are predictably significant. The FCB table size depends on the expected number of flows, the size of the FCB itself, and the FCBM algorithm. The size of the FCB depends on the number and size of service parameters it stores. For example, for a service rich system that expects 2 million active flows at 10 Gbps, the FCB table may contain 1 million entries with each entry requiring as much as 128 bytes. In such case, a Selective Flow-Based Datapath requires 128 Megabytes of memory to store the FCB table. Note that this memory requirement is half the minimal size of the 256 Megabytes of memory that would be required for a pure Flow-Based Datapath. For this reason, the selective nature allows the use of a Flow-Based Datapath in situations where strict memory storage requirements rendered pure Flow-Based Datapath impractical (ex. Network Processor-based line cards).

Both pure Flow-Based Datapaths and Selective Flow-Based Datapaths substitute multiple memory lookups that are necessary for packet processing in a Packet-Based Datapath with a single FCB lookup in a Flow Path. Both Datapath architectures are more memory bandwidth efficient than a Packet-Based Datapath for two reasons:

Elimination of tree traversals and multiple lookups

Effective use of burst mode memory access technology through consolidation of memory accesses.

Furthermore, the Selective Flow-Based Datapath achieves a higher memory bandwidth efficiency than a pure Flow-Based Datapath because it eliminates the memory bandwidth overhead for maintaining FCB entries of flows that do not yield a processing gain, such as short flows.

Both pure Flow-Based Datapaths and Selective Flow-Based Datapaths are expected to achieve higher processor utilization than a Packet-Based Datapath due to the consolidation of small segmented memory accesses. The elimination of multiple memory accesses yields less processor blocking and higher processor utilization. The selective nature of the proposed Selective Flow-Based Datapath ensures that the increase in processor utilization results in a rise in effective throughput.

Both pure Flow-Based Datapaths and Selective Flow-Based Datapaths substitute multiple memory lookups and their associated memory access latencies that are necessary for packet processing in a Packet-Based Datapath with a single FCB lookup in the Flow Path. The significant reduction in memory lookups translates into significant reduction of packet latency in the datapath when compared with a Packet-Based Datapath. Packet processing delay is reduced due to the reduction in memory accesses per packet and elimination of associated processing stalls.

Selective Flow-Based and pure Flow-Based Datapath architectures enable many flow-based services that require flow-state awareness, such as NAT, Firewall, and flow-based QoS. Flow Admission Control, Flow Redirection, Dynamic Flow Filtering, and Flow Intercept are possible flow-based services that could be offered by a Flow-Based Datapath in a manner similar to circuit switching. A Flow-Based Datapath allows for multiple policies to be applied to each packet as a result of one fast exact match memory lookup. That is, a firewall ACL rule can be applied, along with a NAT/NAPT service, an IDS signature determined, and a QoS service level applied with the same stateful flow classification input. Operators can sell service-level agreements when armed with flow-based QoS and selective flow-granular billing services at the network edge in a differentiated-service based network architecture.

Although particular embodiments of the invention have been described and illustrated it will be apparent to one skilled in the art that numerous changes can be made without departing from the basic concepts. It is to be understood, however, that such changes will fall within the full scope of the invention as defined by the appended claims.

The invention claimed is:

1. A packet processor for datapath processing of IP packets, the packet processor comprising:
   a flow path that forwards packets using information stored regarding associated packet flows;
   a packet path that independently forwards packets;
   a flow control block manager that, upon receipt of an incoming packet associated with a new flow, selectively determines whether to create a flow control block for the flow; and
   a path selector, wherein:
      when the flow control block manager creates the flow control block for the flow, the path selector forwards subsequent packets associated with the flow along the flow path, and
      when the flow control block manager determines not to create the flow control block for the flow, the path selector forwards subsequent packets associated with the flow along the packet path.

2. The packet processor as defined in claim 1, wherein the flow control block manager determines whether to create the flow control block based on predefined rules and embedded intelligence.

3. The packet processor as defined in claim 2, wherein the predefined rules include flow and quality of service requirements.

4. The packet processor as defined in claim 2, wherein the predefined rules and embedded intelligence incorporate a flow control block table occupancy threshold algorithm to monitor table occupancy of an exact match flow table, wherein the exact match flow table stores information regarding created flow control blocks.

5. The packet processor as defined in claim 4, wherein a probability that the flow control block is created decreases as the exact match flow table approaches full occupancy.

6. A method of implementing datapath processing of IP packets in a packet processor, the method comprising:
- receiving an incoming packet associated with a flow;
- determining, using a flow control block manager, whether to create a flow control block for the flow based on predetermined criteria;
- when it is determined to create the flow control block for the flow, creating the flow control block and using a path selector to forward subsequent packets associated with the flow along a flow-based datapath; and
- when it is determined not to create the flow control block for the flow, using the path selector to forward subsequent packets associated with the flow along a packet-based datapath.

7. The method of implementing datapath processing as defined in claim 6, wherein the predetermined criteria includes flow-based service requirements.

8. The method of implementing datapath processing as defined in claim 6, wherein the predetermined criteria includes quality of service requirements.

9. The method of implementing datapath processing as defined in claim 6, wherein the predetermined criteria includes a number of memory accesses to be performed during packet processing in the flow-based datapath.

10. The method of implementing datapath processing as defined in claim 6, wherein the predetermined criteria includes an estimated number of packets in the flow, such that flows with a large number of packets are preferentially assigned for flow-based processing.

11. The method of implementing datapath processing as defined in claim 6, wherein the predetermined criteria includes an occupancy level of an exact match flow table, wherein the exact match flow table stores information regarding created flow control blocks.

12. The method of implementing datapath processing as defined in claim 6, wherein the step of determining whether to create the flow control block is implemented by the flow control block manager using weighted credits and flags.

13. A flow control block manager for use in datapath processing of IP packets, the flow control block manager comprising:
- a receiving unit that receives an incoming packet associated with a flow; and
- a decision unit that selectively determines, using at least one decision criterion, whether to create a flow control block for the flow, wherein
- when the decision unit determines to create the flow control block for the flow, the flow control block is created and subsequent packets associated with the flow are forwarded along a flow-based datapath, and
- when the decision unit determines not to create the flow control block for the flow, subsequent packets associated with the flow are forwarded along a packet-based datapath.

14. The flow control block manager as defined in claim 13, wherein the at least one decision criterion includes at least one of a flow-based service requirement flag, a quality of service flag, a number of memory accesses, an estimated number of packets in the flow, and a flow control block table occupancy threshold.

15. The flow control block manager defined in claim 13, further comprising a reevaluation unit that determines whether to remove an existing flow control block based on the at least one decision criterion.

* * * * *